(No Model.)
S. W. PATTON, E. B. GUERIN & W. N. FITZ GERALD.
CARRIAGE SPRING.
No. 350,210. Patented Oct. 5, 1886.
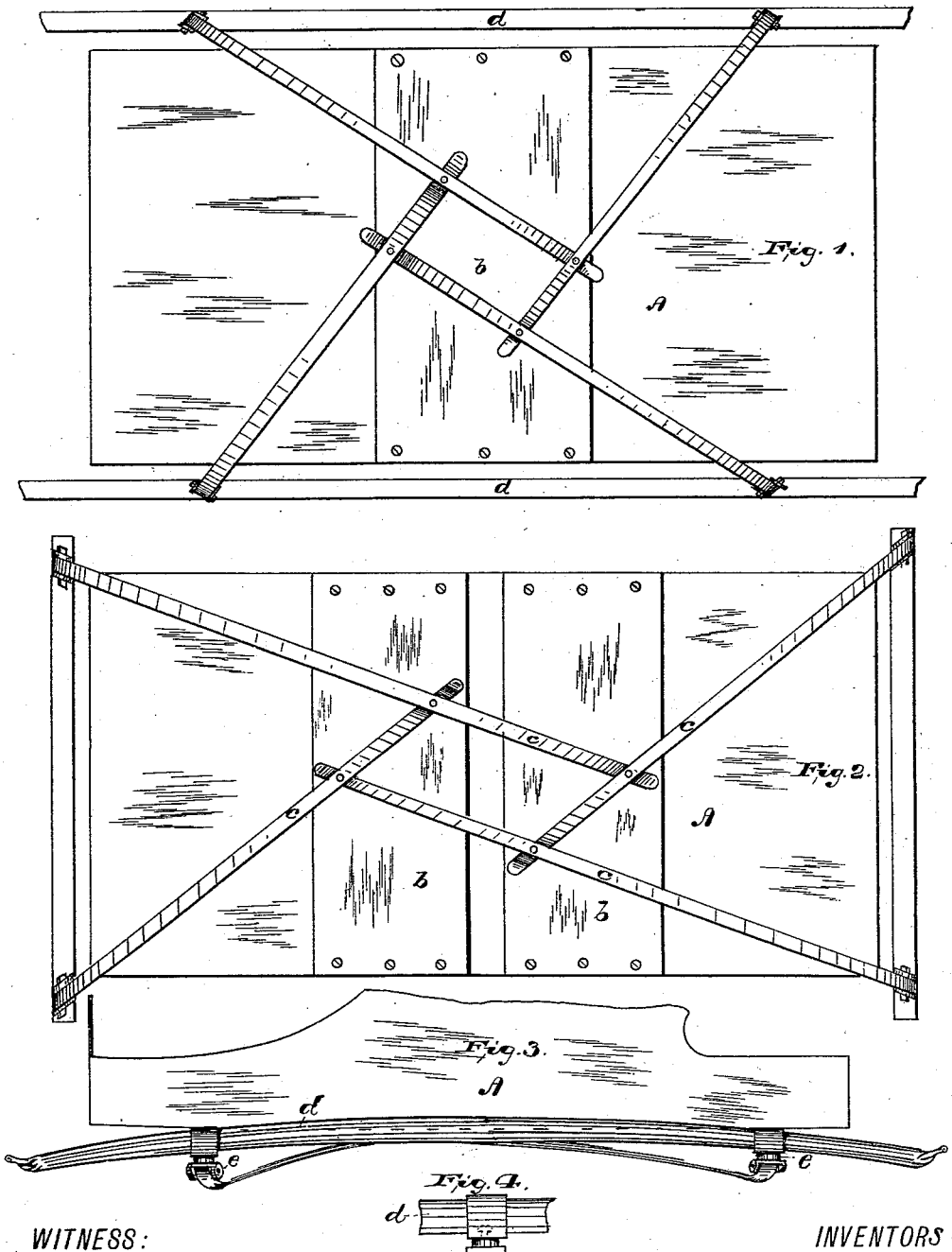
WITNESS:
B. L. McNulty
Fredk. F. Campbell
INVENTORS:
Samuel W. Patton,
Edward B. Guerin,
William N. Fitz Gerald,
by Drake & Co. ATTORNEY

UNITED STATES PATENT OFFICE.

SAMUEL W. PATTON, EDWARD B. GUERIN, AND WILLIAM N. FITZ GERALD, OF NEWARK, NEW JERSEY.

CARRIAGE-SPRING.

SPECIFICATION forming part of Letters Patent No. 350,210, dated October 5, 1886.

Application filed August 14, 1885. Serial No. 174,380. (No model.)

*To all whom it may concern:*

Be it known that we, SAMUEL W. PATTON, EDWARD B. GUERIN, and WILLIAM N. FITZ GERALD, citizens of the United States, residing at Newark, in the county of Essex and State of New Jersey, have invented certain new and useful Improvements in Carriage-Springs; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of vehicle-springs in which diagonally-arranged springs are employed in connection with the side bars of the vehicle, the object of the invention being to provide at a reduced cost, with greater ease of construction, increased strength, a more equal distribution of the weight that may be brought on any one side or end of the body, and to provide for said body a series of widely-disposed bearings on a given plane, which are connected together and on which the said body may be firmly seated without cutting portions of said body away to secure wide bearing-surfaces.

Referring to the accompanying drawings, in which like letters indicate corresponding parts in each of the several figures, Figures 1 and 2 are plans of the under side of a carriage or other vehicle body, indicating two of a variety of ways in which the invention may be employed. Fig. 3 is a side elevation showing more fully the relation of the springs to the side bar and body of the vehicle, and Fig. 4 is an elevation of a clip preferably employed in connection with the improved springs.

In said drawings, *a* indicates the carriage-body, to the under side of which is secured or may be secured a cross bar or bars or a plank, *b*, to provide a firm bearing for the springs.

*c c* are springs, the outer extremities of which are coupled or attached to the usual or ordinary side bars, *d d*, of the vehicle, or to the front and rear spring-bars or axles, or to other springs, as in Fig. 2, attached to the axles, or to the carriage in any other suitable manner. The inner ends of the said springs, upon which the body rests, are interlaced or crossed in the peculiar manner shown in the plans, each of the said inner ends of the series resting on and transmitting pressure to the spring next adjacent on one side, and bearing up the end of the adjacent spring on the other, as will be understood. The said ends form four independent bearings, all distant from the center of the body and from one another, upon which the flat bottom of the vehicle may rest and have a firm and broad support without the necessary use of cross-pieces, such as have been employed in some cases heretofore, where curved springs have crossed one another at the center of the body, to allow for the curvature of the said springs.

The peculiar manner of interlacing described not only gives a very broad bearing for the bottom of the vehicle, and avoids the necessity for the cross-bars for taking up the space caused by the curvature of the springs referred to, but also forms a truss-like frame capable of supporting the body without the aid of bolts, so far as the weight of the body is concerned, although the bolts are useful in preventing the body from working out of place when the vehicle is in motion. The truss thus formed is effective in producing a peculiarly even pressure on the springs, the weight of the body of the vehicle and its contents, even when said contents are on or at one side thereof, being widely distributed. Where each individual spring of the series crosses the end of the one next adjacent, the said end acts as a fulcrum over which the spring works, the portion of the spring between the said fulcrum and where it rests or is supported being effective not only in giving strength to the truss-like frame, but also co-operating in imparting the desired spring action to body when the vehicle is in motion.

The springs may be held to one another and to the body of the vehicle by bolts, as shown, or by suitable clips, and each individual spring may be of a single or of several overlying leaves, and may be straight or curved when viewed in elevation. We prefer to connect the outer extremities of the spring to the side bars or other bearings, when convenient to do so, by means of swivel-clips *e*, whereby the springs may adjust themselves automatically, and thus avoid any danger of binding.

We are aware that springs have heretofore been arranged in a diagonal relation to the front or side bars of a wagon, and consequently we do not claim the same herein; but where short and comparatively inexpensive springs were employed they have not overlapped at their inner extremities, so that the weight on one spring has been transmitted to the next, and thence to a third, and thus distributed over the whole truss. By our arrangement, when getting into the vehicle from one side the body is not to any great extent drawn to one side, as in vehicles now in use. By the peculiar arrangement of parts we are also enabled to secure widely-distributed but connected bearings on a given plane, which present flat horizontal surfaces to the body. By this construction it is not necessary to cut the cross-bars away, as when said cross-bars rest on curved springs in the manner illustrated in Patent No. 219,964, and no central curvature is formed that would cause the body to rock were the separated cross-bars dispensed with. We are also enabled to use a smaller number of bolts to attach the body to the several short springs with adequate security than in other somewhat similar constructions.

What we claim as our invention is—

In a vehicle, the combination, with the body and bars $d\ d$ thereof, of springs $c\ c$, attached to said bars at their outer extremities and having their inner ends all interlaced, forming a truss-like structure, and also forming a series of separated bearings, the downward pressure on any given bearing being distributed throughout the series, substantially as set forth.

In testimony that we claim the foregoing we have hereunto set our hands this 5th day of August, 1885.

SAMUEL W. PATTON.
EDWARD B. GUERIN.
WM. N. FITZ GERALD.

Witnesses:
CHARLES H. PELL,
FREDK. F. CAMPBELL.